United States Patent
Blattry et al.

[15] 3,656,773
[45] Apr. 18, 1972

[54] CHUCK FOR TURNING MACHINES

[72] Inventors: Hans Blattry; Wolfgang Kimm, both of Buderich, Germany

[73] Assignee: Paul Forkardt Kommanditgesellschaft, Dusseldorf, Germany

[22] Filed: July 1, 1970

[21] Appl. No.: 51,440

[30] Foreign Application Priority Data

Feb. 4, 1970  Germany.....................P 20 04 889.9

[52] U.S. Cl..............................279/121, 279/110, 279/112, 279/114
[51] Int. Cl......................................................B23b 31/16
[58] Field of Search...................279/114, 116, 110, 121, 112

[56] References Cited

UNITED STATES PATENTS

| 1,594,716 | 8/1926 | Forkardt | 279/114 |
| 2,602,673 | 7/1952 | Deuring et al. | 279/121 X |
| 3,420,539 | 1/1969 | Pahlitzsch et al. | 279/112 |
| 3,507,509 | 4/1970 | Benjamin et al. | 279/112 |

Primary Examiner—Andrew R. Juhasz
Assistant Examiner—F. R. Bilinsky
Attorney—Walter Becker

[57] ABSTRACT

The specification discloses a chuck for a machine tool having radially movable jaws for engaging a workpiece. A rotatable drive member in the chuck body engages the jaws and is movable between certain limits to actuate the jaws positively in radial movement on the chuck body. Movement of the drive member beyond one of its limits releases the jaws from the drive member and simultaneously releases holding pins which engage the jaws. Each holding pin is manually movable into jaw disengaging position to permit the jaws to be removed from or introduced into the chuck body, or to be radially adjusted on the chuck body.

7 Claims, 2 Drawing Figures

CHUCK FOR TURNING MACHINES

The present invention relates to a chuck for turning machines with radially movable jaws and adapted in an end position to be separated from a driving member for removal from the chuck body.

With heretofore known chucks in which the sets of jaws are, for purposes of exchanging the same, adapted to be removed from the chuck body, the movement of the driving member can, for purposes of separating the chucks from the driving member, be extended beyond the stroke necessary for loosening or tightening the jaws. As soon as the driving member haS moved by an additional distance beyond said necessary stroke, it disengages the jaws so that the said jaws can be radially removed from the chuck body and can be replaced by other sets of jaws. Various types of chucks are known from which the jaws can be radially removed out of the guiding grooves for the chuck body as soon as the driving member has been moved beyond the stroke necessary for loosening or tightening the chucks. According to one embodiment, a so-called plane spiral chuck is employed according to which the individual windings of the plane spiral are not arranged in a continuous successive manner but are located in spaced relationship to each other so that at a certain position of the plane spiralm the clamping chucks can be radially pulled out through the gaps between the individual plane spiral windings. According to another embodiment of a clamping chuck, a so-called wedge rod chuck is employed according to which either wedge rods arranged tangentially to the axis of rotation or axis-parallel thereto by means of inclined teeth engage corresponding teeth of the jaws. For purposes of removal of the clamping jaws, the said wedge rods are additionally displaced to such an extent that their teeth disengage the teeth of the pertaining clamping jaw so that the latter can be removed from the chuck body in a radially outward direction.

With these heretofore known clamping jaws for turning machines, there exists the danger that the clamping jaws when disengaging the driving member, fly out of the chuck body if the operator, contrary to the instructions, rotates the spindle carrying the clamping jaw. In these circumstances, very serious accidents may be caused. While optical indications have been provided for attracting the attention of the operator whenever the clamping jaws disengage the driving member, these warning devices by themselves do not exclude accidents of the above mentioned type.

It is, therefore, an object of the invention to provide a clamping chuck for turning machines with radially movable clamping jaws which at an end position may be separated from the driving member for purposes of removal of the chuck body, and the clamping jaws of which are in their position separated from the driving member automatically held stationary in the chuck body by an additional holding member which latter can be released manually only when it is definitely intended to remove the jaws.

This object and other objects and advantages of the invention will appear more clearly from the following specification in connection with the accompanying drawings, in which.

Figure 1:
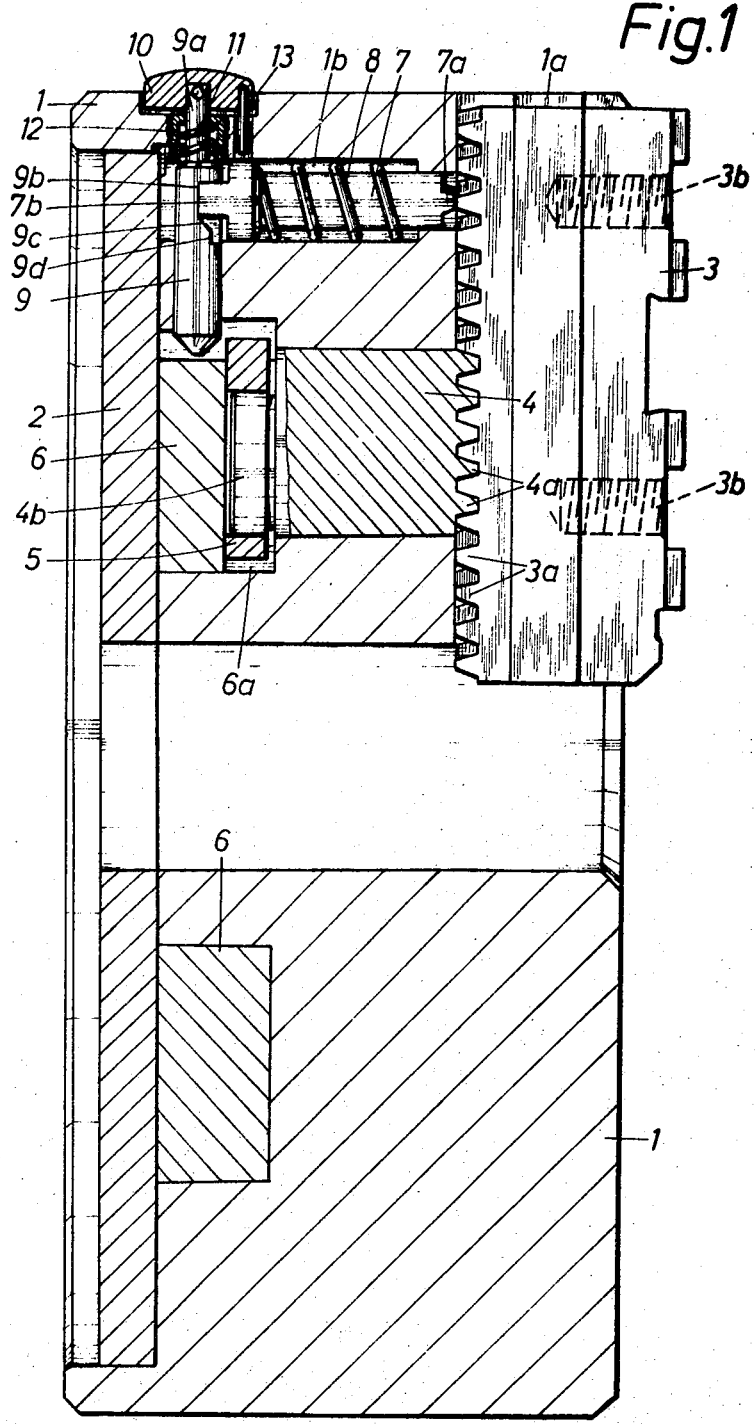
FIG. 1 represents a longitudinal section through a clamping chuck according to the invention.

The chuck according to the present invention is characterized primarily in that each clamping jaw has associated therewith a holding pin which is displaceable in the chuck body and which, in view of the movement of the driving member over the additional stroke, is adapted to be advanced into the path of the clamping jaw in a direction transverse to the direction of movement of the latter or for purposes of advancement is adapted to be released by a spring, said holding pin, for returning the driving member into the path for clamping and releasing being disengageable from the clamping jaw or being pulled back by a spring is adapted to be released. The invention is furthermore characterized in that each holding pin has associated therewith a locking member which, for purposes of pulling back the holding pin from engagement with the clamping jaw, is manually operable.

According to a further feature of the invention, the locking member may be in the form of a locking pin which is radially guided in the chuck body and which, in the end position of the driving member for purposes of removing the jaws from the chuck body, is adapted by a control member arranged on the driving member automatically to be moved into locking position from which said pin may be manually moved back against the thrust of a spring. According to the invention, the control member is formed by a control bolt which is guided in a bore of the driving member and is under the load of a spring.

A chuck according to the invention for rotary machines is characterized in that the clamping jaws are held in their respective position by the pertaining holding pin. For purposes of removing the jaws, the locking system therefor is, by means of the holding pin, made ineffective only as long as the control pin is manually displaced against the thrust of a spring. In this way, it will be assured that also with an incomplete jaw change, accidents will be safely prevented. In view of the arrangement of the holding pin, additional locking bolts for locking the clamping jaws, which are not in engagement with the driving member, in the same position will be superfluous.

According to a preferred embodiment of the manual release of the locking pin, it is suggested according to the invention to provide the locking pin with an extension which extends out of the chuck body and to which a push button is connected. It is furthermore suggested to place the control pin when in locking position under load by means of a return spring resting on the chuck body.

For connecting the holding pin and the control pin, two possibilities exist: a fractional and positive connection. The fractional connection is, according to a further feature of the invention, characterized in that the holding pin is, by means of its head by a control profile designed on the locking pin, adapted to be displaced in conformity with the radial adjustment of said head counter to or by a pressure spring. As alternative thereto, it is suggested according to the invention positively to connect the holding pin with the locking pin in such a way that it is displaceably guided in conformity with its radial adjustment.

Referring now to the drawings in detail, the drawings show a clamping chuck with a relatively short chuck body. In radial guiding grooves 1a of the chuck body 1 there are displaceable three base jaws 3 to which a non-illustrated auxiliary jaw may be connected by means of a cross offset. For purposes of connecting the auxiliary jaw, each base jaw 3 is provided with threaded bores 3b. Behind each base jaw 3 there is displaceably arranged a wedge bar 4 located in a tangential groove of the chuck body 1, said wedge bar 4 being displaceably guided in a direction transverse to the base jaw 3. On one portion of the surface facing the base jaw 3, the wedge bar 4 has inclined wedge bar teeth 4a which, in the gaps of a tooth system 3a of the wedge bar teeth 4a, pass into the hollow spaces or gaps of tooth system 3a at the return side of the base jaw 3. Each wedge bar 4 has its back side provided with a cylindrical stud 4b which extends parallel to the axis of rotation of the clamping chuck. Rotatably journalled on pivot 4b is a sliding stone 5 which has its parallel plane outer surfaces located in a radial groove 6a of a driving ring 6 which is rotatably and coaxially journalled in the chuck body 1. These elements of a known wedge bar chuck are held in the chuck body 1 by means of a lid 2.

Behind each base jaw 3 in an offset bore 1b, which is provided in the chuck body 1 and is parallel to the axis of rotation of the chuck, there is longitudinally displaceably guided a holding pin 7. The front end of holding pin 7 forms a profile tooth 7a which is inclined to the base jaw 3 by the same angle as the wedge teeth 4a. A pressure spring 8 engaging the head 7b of the holding pin 7 and installed under a preload exerts a rearwardly directed force upon the holding pin 7 which force holds said pin in its normal position so as to be in disengagement with the teeth 3a of the base chuck 3.

The flattened head 7b of the holding pin 7 engages a control profile 9b, 9c, 9d of a radially displaceable locking pin 9 which is guided in the chuck body 1. The said head 7b is simultaneously held against rotation by the said control profile. In the inner end position of the control pin 9 illustrated in FIG. 1, the holding pin 7 engages the lowest portion 9b of the control profile. Pin 7 occupies its retracted end position. In the outer end position of the control pin 9, which is associated with FIG. 2, the holding pin 7 will rest against the hollow part 9d of the control profile. In this instance, the profile tooth 7a extends into the path of the teeth 3a.

The locking pin 9 is provided with an extension 9a which is reduced in diameter and over which there is placed a return spring 11 which rests against a threaded cap 12 screwed into the chuck body 1. This return spring 11 continuously exerts an inwardly directed force upon the locking pin 9. Mounted on the upper end of the extension 9a is a push button 10 which is held fast on the extension 9a by means of a transverse pin. A guiding pin 13 pressed into the push button 10 extends into a bore of the chuck body 1 and thus prevents the locking pin 9 from rotating.

The inner end of the locking pin 9 forms a truncated cone which cooperates with a control member arranged on the driving member (driving ring 6). This last mentioned control member is, in the embodiment illustrated in the drawing, designed as a control bolt 14 with a conical head which is guided in the same plane as the locking pin 9 in a radial blind hole in the driving ring 6 and which is continuously under the load of a spring 15.

Figure 2:
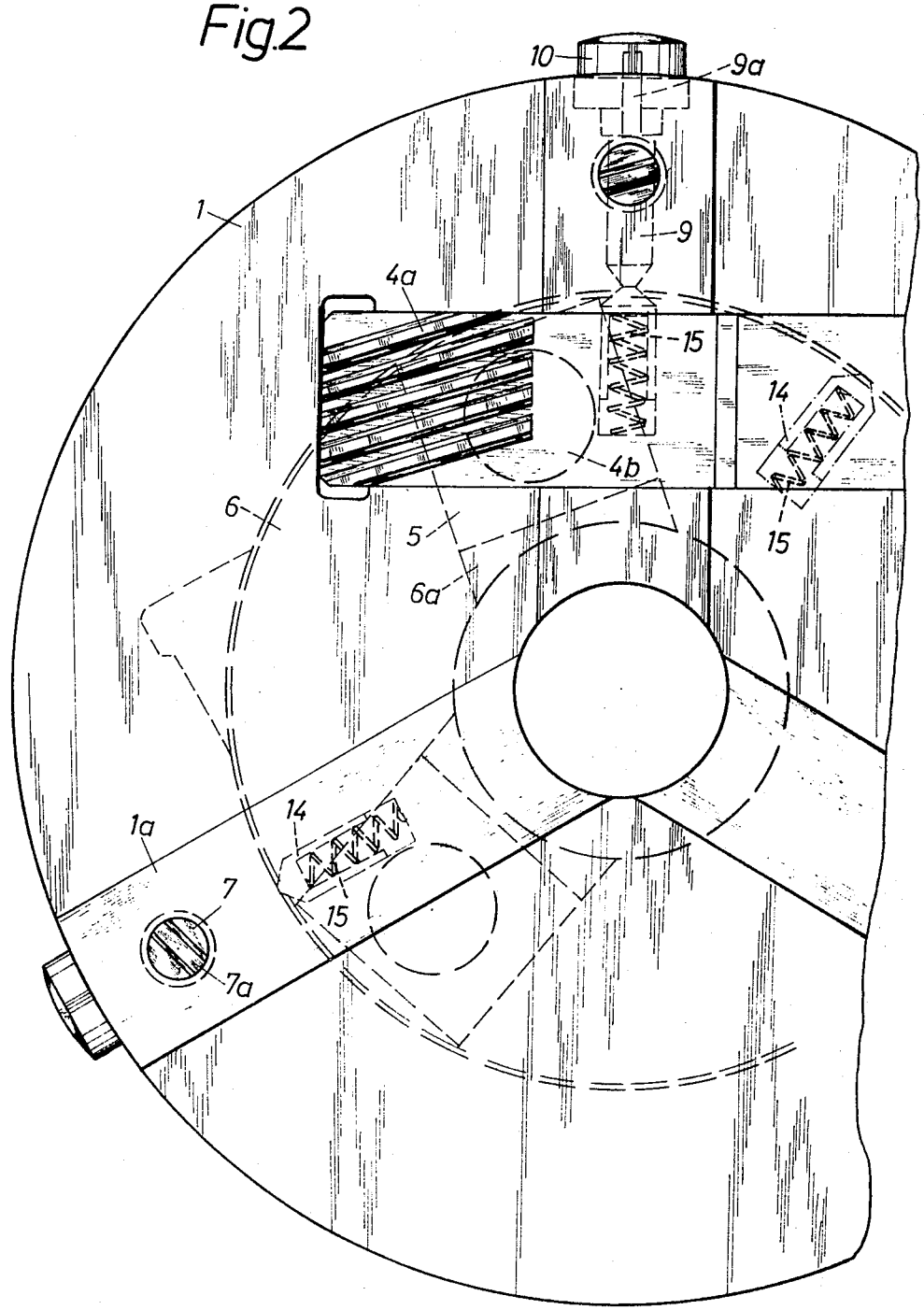
FIG. 2 illustrates a portion of a front view of the chuck with the base jaws removed while the upper portion of FIG. 2 shows a cross section in the plane of the wedge rod.

The driving ring 6 is adapted in the chuck body 1 to be turned back and forth between two end positions in conformity with the end positions of the wedge bars 4. When the wedge bars 4 are in conformity with FIG. 2 in their left-hand end positions, so that the wedge teeth 4a are not in engagement with the teeth 3a of the base jaws 3, each control bolt 14 will be located in the center behind a base jaw 3 below the pertaining locking pin 9 as illustrated in FIG. 2. Inasmuch as spring 15 is stronger than the return spring 11, it moves the locking pin 9 to its outermost end position so that the push button 10 protrudes from the chuck body 1 as is illustrated in FIG. 2. Furthermore indicated in FIG. 2 by dot-dash lines, is the control bolt 14 with spring 15. These members 14 and 15 are shown in a position which is occupied by a bolt 14 when the driving ring 6 and the wedge bars 4 are located in their opposite end position. The control bolt 14 will in this instance rest upon the inner marginal portion of the recess of the chuck body 1 for the driving ring 6.

The operation of the chuck according to the invention is as follows. The base jaws 3 which are radially movable in the guiding grooves 1a of the chuck body 1 are driven through the intervention of wedge bars 4 which in their turn are moved in their tangential grooves of the chuck body 1 by means of drive ring 6 which latter through sliding blocks 5 and studs 4b is connected to the wedge bars 4. Drive ring 6 may in this instance be turned back and forth either manually or by a back-operated member.

According to the position shown in FIG. 2, the profile teeth 7a of the holding pins 7 engage tooth spaces of the teeth 3a and thus hold the base jaws 3 stationary to such an extent that during the movement of the wedge bars 4 toward the right with regard to FIG. 2, the wedge bar teeth 4a will be able without hitting any elements be moved into the teeth 3a on the base jaws 3. Already when slightly turning the drive ring 6 further, the control bolts 14 will slide below the locking pins 9 so that the latter can, by means of adjusting springs 11, be moved to their inner end position shown in FIG. 1. Simultaneously, the pressure springs 8 move the holding pins 7 to their left-hand position and thus pull the profile teeth 7a of the holding pins 7 out of the teeth 3a. During the further movement of the drive ring 6 and wedge bars 4 the wedge bar teeth 4a will, due to their inclined position, bring about a radial movement of the base jaws 3 for chucking a work piece.

For the ordinary chucking and releasing of a work piece with the same diameter, driving ring 6 and wedge bars 4 are moved each time only by a fraction of their stroke in order to press the clamping jaws against the work piece or to remove portions therefrom. In order to be able to chuck work pieces of considerably different diameter, by correspondingly actuating the drive, the driving ring 6 and the wedge bars 4 are moved into FIG. 2 position. Shortly before the wedge bar teeth 4a completely leave the teeth 3a, the control bolts 15 lift the locking pin 9 while inclined surfaces 9c between the lower part 9b and the higher part 9d of the control profile press the holding pins 7 forwardly so that the profile tooth 7a thereof again meshes with the teeth 3a of the respective base jaw 3. If in this position of the chuck, for lack of knowledge of the inner function thereof or due to carelessness, the spindle of the turning machine is rotated so that the chuck rotates, the base jaws 3 cannot be thrown out because the profile teeth 7a will hold fast said jaws 3 in their respective position.

In order to be able to displace the base jaws 3 relative to the wedge bar 4 or to remove the base jaws 3 from the chuck body 1, the push button 10 has to be depressed and thus the locking pin 9 while overcoming the thrust of spring 15 has to be moved inwardly. As a result thereof, the control profile 9b, 9c, 9d frees the holding pin 7 so that the pressure spring 8 will be able to push back the holding pin 7. The holding pin 7, the locking pin 9 and the push button 10 will then occupy the position shown in FIG. 1. However, below the control pin 9 there is also located the control bolt 14 which in view of the push button 10 being depressed will be pressed inwardly over the position shown in FIG. 2. In this position, the base jaw 3, the teeth 3a of which disengage the wedge bar teeth 4a of wedge bar 4, may either be removed or may be displaced relative to the wedge bar 4. By a careful releasing of the push button 10, it is possible during the displacement to introduce the profile tooth 7a into that tooth space of the teeth 3a which corresponds to the desired new position of the base jaw 3.

Each base jaw 3 is, immediately after releassing the push button 10, secured in its respective position so that lack of knowledge, carelessness or distraction of the operator can in no position of the inner parts of the chuck lead to an accident.

It is, of course, to be understood that the present invention is, by no means, limited to the particular construction shown in the drawings, but also comprises any modifications within the scope of the appended claims.

What is claimed is:

1. In a chuck for a machine tool: a body rotatable on an axis and having racial slots, a chuck jaw slidably fitted in each slot, a drive member in said body normally engaging said jaws and rotatable between predetermined limits for moving said jaws radially on said body, said drive member disengaging from said jaws when rotated beyond one of said limits, a holding pin in said body for each jaw and each movable from a first position of engagement with the respective jaw to a second position of disengagement therefrom, first spring means urging each pin toward the said second position thereof, a block member in the body for each pin and each movable from a first position wherein the respective holding pin is held in the said first position thereof to a second position wherein the holding pin is released for movement to the second position thereof, second spring means urging each blocking member toward the said second position thereof, and resilient actuating means on said drive member operable when the driving member is moved beyond said one limit to engage said blocking members and urge the blocking members toward the said first position thereof, each blocking member being normally movable from the first position to the second position thereof against the bias of said second spring means and said resilient actuating means.

2. A chuck according to claim 1, in which each blocking member is in the form of a pin member movable radially in said body at the end of the respective holding pin opposite the jaw end thereof, said resilient actuating means comprising an actuating cam element for each pin member, each actuating cam element being carried by said drive member and resiliently biased radially outwardly thereon.

3. A chuck according to claim 2, in which each cam element is in the form of a bolt, a radial bore in said drive member for each bolt, and a spring urging each bolt radially outwardly in its said bore.

4. A chuck according to claim 1, in which each blocking member is in the form of a pin member radially movable in said body and spring biased in the radially inward direction, each pin member having a portion protruding radially from said body, and a pushbutton mounted on the said protruding portion.

5. A chuck according to claim 4, in which each pin element is formed with a control profile and each holding pin has a head position engaging the profile of the respective pin element.

6. A chuck according to claim 1, in which said holding pins and the respective blocking members are positively interconnected for movement in unison.

7. A chuck according to claim 1, which includes an actuating slide for each jaw movable in the body at right angles to the slot for the respective jaw and having inclined teeth on the jaw side and being operatively connected to said drive member on the other side, inclined teeth in the jaw engaging the teeth on the slide, and the holding pin for each jaw having at least one tooth on the jaw end for engagement with the said teeth on the respective jaw.

* * * * *